(12) United States Patent
Nakano et al.

(10) Patent No.: US 12,486,192 B2
(45) Date of Patent: Dec. 2, 2025

(54) FORMING APPARATUS

(71) Applicant: AGC Inc., Tokyo (JP)

(72) Inventors: Masanori Nakano, Tokyo (JP); Motoichi Iga, Tokyo (JP); Kohta Okamoto, Tokyo (JP); Hiroki Ishibashi, Tokyo (JP)

(73) Assignee: AGC Inc., Tokyo (JP)

( * ) Notice: Subject to any disclaimer, the term of this patent is extended or adjusted under 35 U.S.C. 154(b) by 276 days.

(21) Appl. No.: 18/064,386

(22) Filed: Dec. 12, 2022

(65) Prior Publication Data

US 2023/0110501 A1 Apr. 13, 2023

Related U.S. Application Data

(63) Continuation of application No. PCT/JP2021/023042, filed on Jun. 17, 2021.

(30) Foreign Application Priority Data

Jun. 25, 2020 (JP) ................................. 2020-109936

(51) Int. Cl.
   *C03B 17/06* (2006.01)
(52) U.S. Cl.
   CPC .................. *C03B 17/064* (2013.01)
(58) Field of Classification Search
   None
   See application file for complete search history.

(56) References Cited

U.S. PATENT DOCUMENTS

| 3,338,696 | A | 8/1967 | Dockerty |
| 4,203,750 | A | 5/1980 | Shay |
| 2005/0076677 | A1* | 4/2005 | Pitbladdo .............. C03B 17/064 65/195 |
| 2005/0268658 | A1* | 12/2005 | Adamowicz .......... C03B 17/064 65/195 |

(Continued)

FOREIGN PATENT DOCUMENTS

| CN | 1984849 A | 6/2007 |
| CN | 202924895 U | 5/2013 |

(Continued)

OTHER PUBLICATIONS

Edge behaviour in glass sheet (Year: 2015).*

*Primary Examiner* — Jodi C Franklin
(74) *Attorney, Agent, or Firm* — Oblon, McClelland, Maier & Neustadt, L.L.P.

(57) ABSTRACT

A forming apparatus for forming a glass ribbon is provided. The forming apparatus has an axial direction extending from a first end to a second end thereof. The first end is located on an inlet side from which molten glass is supplied. The forming apparatus includes a first protruding portion and a second protruding portion that are disposed at a top thereof and extend from the first end to the second end. A channel is provided between the first protruding portion and the second protruding portion. The molten glass flows within the channel from the first end toward the second end. In a top view, a channel width of the channel continuously decreases toward the second end in a vicinity of the second end and becomes 0 (zero) at the second end. The channel width is in a direction perpendicular to the axial direction.

14 Claims, 12 Drawing Sheets

(56) References Cited

U.S. PATENT DOCUMENTS

| | | | |
|---|---|---|---|
| 2007/0144210 A1* | 6/2007 | Pitbladdo | C03B 17/064 65/90 |
| 2011/0277504 A1* | 11/2011 | Pitbladdo | C03B 17/067 65/53 |
| 2016/0185643 A1* | 6/2016 | Kersting | C03B 17/02 65/195 |
| 2019/0119139 A1* | 4/2019 | Boratav | C03B 17/064 |
| 2019/0284082 A1* | 9/2019 | Boratav | C03B 17/064 |
| 2021/0163332 A1* | 6/2021 | Amosov | C03B 17/02 |

FOREIGN PATENT DOCUMENTS

| | | | | |
|---|---|---|---|---|
| CN | 104163561 A | * | 11/2014 | ........... C03B 17/064 |
| CN | 204079755 U | * | 1/2015 | ........... C03B 17/064 |
| CN | 209024403 U | | 6/2019 | |
| CN | 215365458 U | * | 12/2021 | ........... C03B 17/064 |
| JP | 5506322 B2 | * | 5/2014 | |
| KR | 101133391 B1 | * | 4/2012 | ........... C03B 17/064 |
| WO | WO-0185630 A2 | * | 11/2001 | ........... C03B 17/064 |
| WO | WO-2016201055 A1 | * | 12/2016 | ........... C03B 17/064 |
| WO | WO-2017176883 A1 | * | 10/2017 | ........... C03B 17/064 |
| WO | WO-2017192634 A1 | * | 11/2017 | ............ C03B 13/00 |
| WO | WO 2018/098114 A1 | | 5/2018 | |
| WO | WO-2020033638 A1 | * | 2/2020 | ............ B32B 17/06 |

\* cited by examiner

FORMING APPARATUS

CROSS-REFERENCE TO RELATED APPLICATIONS

This application is a continuation of International Application No. PCT/JP2021/023042, filed on Jun. 17, 2021 and designating the U.S., which claims priority to Japanese Patent Application No. 2020-109936, filed on Jun. 25, 2020. The contents of these applications are incorporated herein by reference in their entirety.

BACKGROUND OF THE INVENTION

1. Field of the Invention

The disclosure herein relates to a forming apparatus, and more particularly relates to a forming apparatus used to produce a glass plate.

2. Description of the Related Art

As a type of continuous production process for glass plates, a down-draw process is known. A typical example of the down-draw process is a fusion process (Patent Document 1, for example).

In the fusion process, molten glass obtained by melting a glass material is supplied to a channel provided at the top of a forming apparatus (hereinafter referred to as a "forming apparatus"). The forming apparatus is substantially wedge-shaped and pointed downward in cross section, and the molten glass flows down along two opposed side surfaces of the forming apparatus.

The molten glass flowing down along the two side surfaces is joined and integrated at the lower edge of the forming apparatus to form a glass ribbon. Thereafter, the glass ribbon is drawn downward by traction members such as rollers while being slowly cooled down, and cut to have predetermined dimensions.

When a forming apparatus as described above is used to form a glass ribbon, there may be problems in that a portion of the glass ribbon is crystallized (that is, devitrified) or the glass composition changes locally. There may also be a problem in that a uniform thickness across the width of the glass ribbon cannot be often obtained.

RELATED-ART DOCUMENTS

Patent Documents

Patent Document 1: Patent Document 1: U.S. Pat. No. 3,338,696

SUMMARY OF THE INVENTION

It is desirable to provide a forming apparatus in which, when forming a glass ribbon, devitrification and composition changes do not readily occur and variations in the thickness across the width of the glass ribbon can be reduced.

According to an embodiment, a forming apparatus for forming a glass ribbon is provided. The forming apparatus has an axial direction extending from a first end to a second end thereof. The first end is located on an inlet side from which molten glass is supplied. The forming apparatus includes a first protruding portion and a second protruding portion that are disposed at a top thereof and extend from the first end to the second end. A channel is provided between the first protruding portion and the second protruding portion. The molten glass flows within the channel from the first end toward the second end. In a top view, a channel width of the channel continuously decreases toward the second end in a vicinity of the second end and becomes 0 (zero) at the second end. The channel width is in a direction perpendicular to the axial direction.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following a forming apparatus according to an embodiment of the present invention will be described with reference to the accompanying drawings.

Conventional Forming Apparatus

First, in order to better understand the configuration and features of the forming apparatus according to the embodiment of the present invention, the configuration of a conventional forming apparatus will be briefly described with reference to FIG. 1 through FIG. 3.

Figure 1:
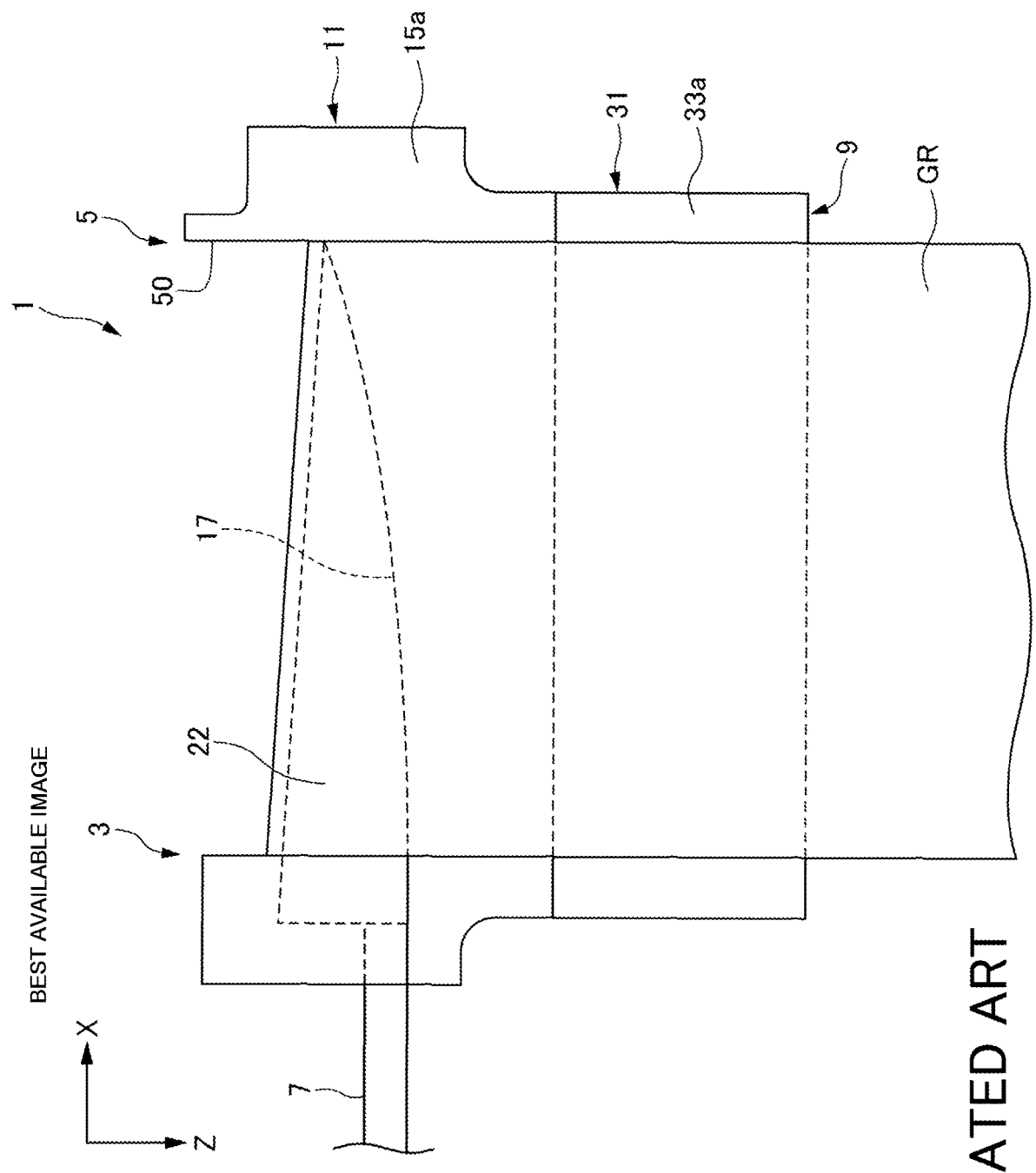
FIG. 1 is a drawing schematically illustrating the configuration of a conventional forming apparatus used in a fusion process.

FIG. 1 is a drawing schematically illustrating the configuration of a conventional forming apparatus used in a conventional fusion process. FIG. 2 is a top view schematically illustrating the forming apparatus of FIG. 1. FIG. 3 is a cross-sectional view schematically illustrating the forming apparatus taken through I-I of FIG. 2. Note that the forming apparatus that is currently being used is depicted in FIG. 1 through FIG. 3.

Figure 2:
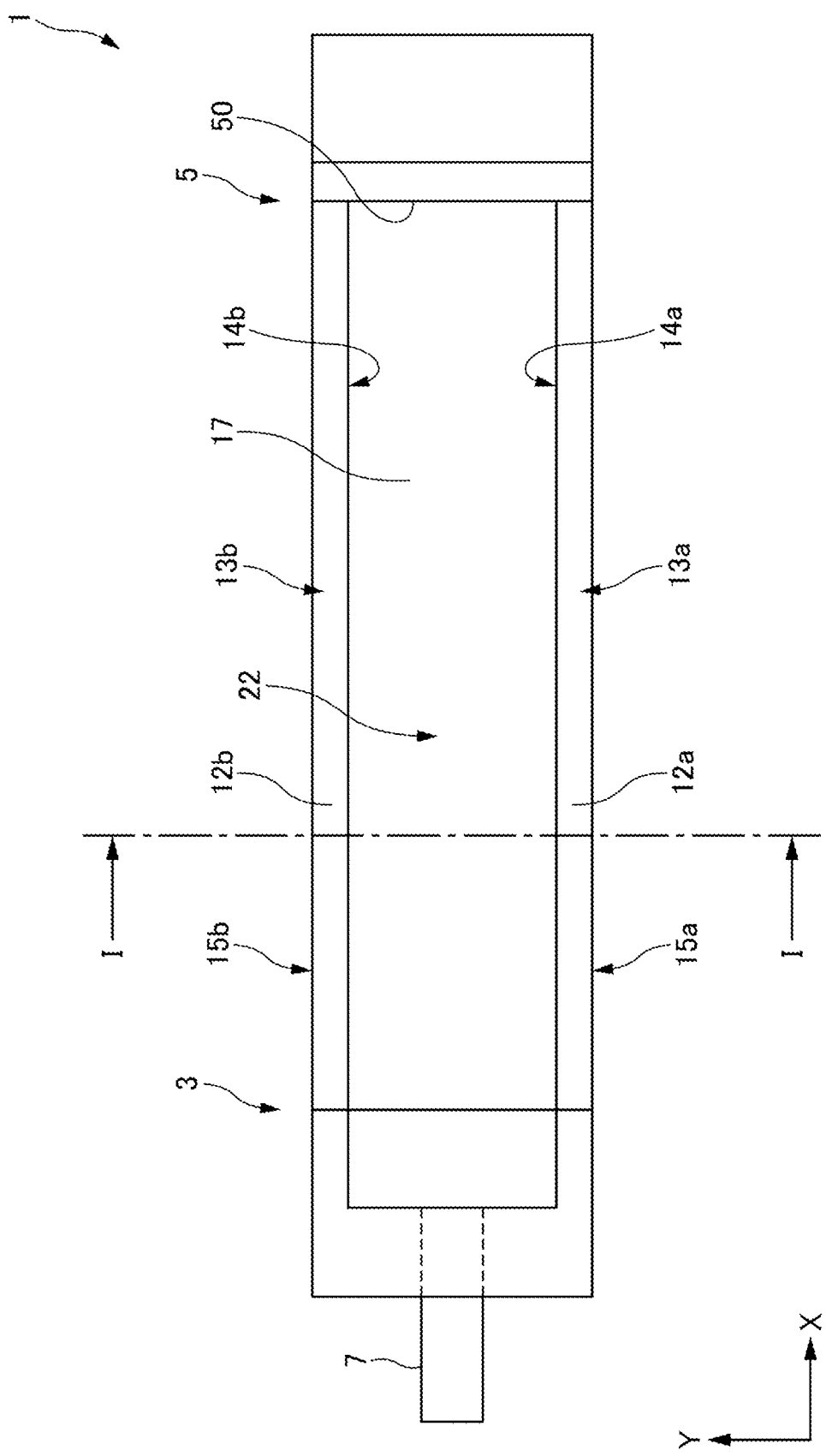
FIG. 2 is a top view schematically illustrating the forming apparatus of FIG. 1.
Figure 3:
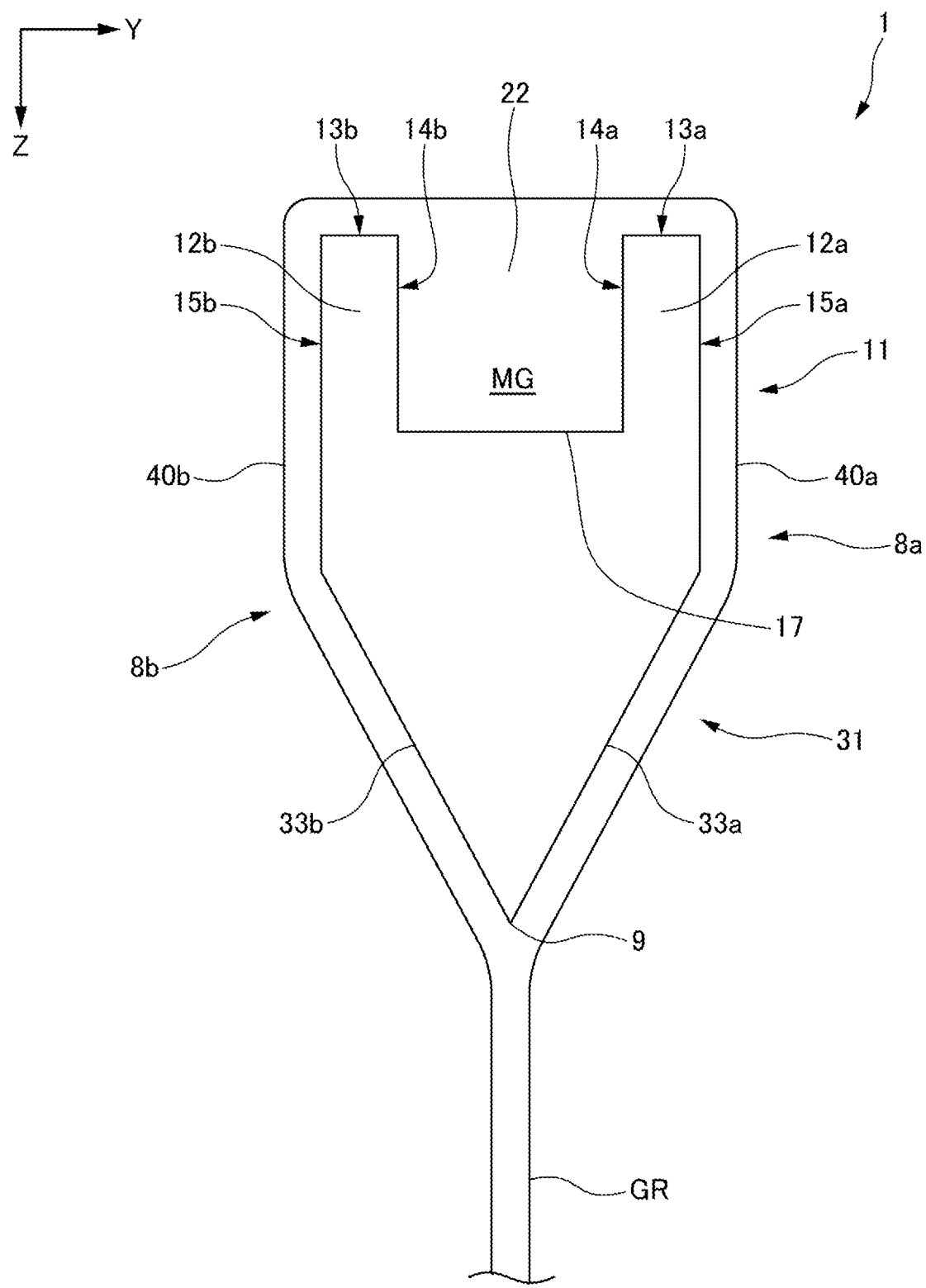
FIG. 3 is a cross-sectional view schematically illustrating the forming apparatus taken through I-I of FIG. 2.

As illustrated in FIG. 1 through FIG. 3, a conventional forming apparatus 1 has an axial direction (X direction) extending from a first end 3 to a second end 5, and the first end 3 is connected to a supply pipe 7 for molten glass.

As illustrated in FIG. 3, the forming apparatus 1 has a substantially wedge shape in cross section perpendicular to the axial direction, and has two outer surfaces 8a and 8b that are opposite to each other. The two outer surfaces 8a and 8b are joined at a confluence edge 9.

The forming apparatus 1 has a first portion 11 on the upper side thereof and a second portion 31 on the lower side thereof.

The first portion 11 of the forming apparatus 1 includes two protruding portions 12a and 12b that are opposite to each other. The protruding portion 12a has an upper surface 13a, an inner surface 14a, and an outer surface 15a. The inner surface 14a and the outer surface 15a extend along the vertical direction (Z direction) and are opposite to each other. The inner surface 14a and the outer surface 15a are connected by the upper surface 13a. Similarly, the protruding portion 12b has an upper surface 13b, an inner surface 14b, and an outer surface 15b.

Further, the first portion 11 of the forming apparatus 1 has a bottom surface 17 between the two protruding portions 12a and 12b. The bottom surface 17 is configured to gradually decrease in depth from the first end 3 toward the second end 5 of the forming apparatus 1.

A channel 22 is defined in the first portion 11 by the inner surface 14a of the protruding portion 12a, the inner surface 14b of the protruding portion 12b, and the bottom surface 17. Because of the shape of the bottom surface 17, the channel 22 is configured such that the depth of the channel 22 gradually decreases from the first end 3 toward the second end 5 of the forming apparatus 1 and becomes zero in the vicinity of the second end 5.

The second portion 31 of the forming apparatus 1 has exterior surfaces 33a and 33b that are opposite to each other. The exterior surface 33a of the second portion 31 is connected to the outer surface 15a of the first portion 11, thereby constituting the outer surfaces 8a of the forming apparatus 1. Similarly, the exterior surface 33b of the second portion 31 is connected to the outer surface 15b of the first portion 11, thereby constituting the outer surfaces 8b of the forming apparatus 1.

When the conventional forming apparatus 1 is used, molten glass MG is supplied from the supply pipe 7 to the forming apparatus 1.

The molten glass MG supplied to the forming apparatus 1 flows from the first end 3 to the second end 5 through the channel 22.

The molten glass MG supplied to the channel 22 then overflows from the protruding portions 12a and 12b of the first portion 11 of the forming apparatus 1, and flows down along the outer surfaces 15a and 15b.

Accordingly, as illustrated in FIG. 3, a first molten glass portion 40a is formed on the outer surface 15a of the first portion 11 of the forming apparatus 1, and a second molten glass portion 40b is formed on the outer surface 15b of the first portion 11.

Thereafter, the first molten glass portion 40a flows further down along the exterior surface 33a of the second portion 31 of the forming apparatus 1. Similarly, the second molten glass portion 40b flows further down along the exterior surface 33b of the second portion 31 of the forming apparatus 1.

As a result, the first molten glass portion 40a and the second molten glass portion 40b reach the confluence edge 9 and are integrated. In this manner, a glass ribbon GR is formed.

Thereafter, the glass ribbon GR is further drawn out in the vertical direction, and is slowly cooled.

In the conventional fusion process, the glass ribbon GR is produced as described above and a glass plate is further produced.

In the conventional forming apparatus 1, when a glass ribbon GR is formed, problems such as devitrification of a portion of the glass ribbon GR and local changes in the glass composition are often observed. In addition, there is often a problem in that a uniform thickness across the width (X direction in FIG. 1) of the glass ribbon GR cannot be obtained.

In order to address such problems, the inventors of the present application have diligently investigated the causes of devitrification, composition changes, and nonuniformity of the thickness of the glass ribbon GR. As a result, the inventors have found that these problems are caused by the structure of the channel 22.

That is, as illustrated in FIG. 1, in the conventional forming apparatus 1, a blocking wall 50 is provided on the tip side of the channel 22, that is, on the second end 5 side of the forming apparatus 1. The blocking wall 50 is provided so as to restrict the flow of molten glass MG in the axial direction (X direction) and prevent the molten glass MG, which flows in the axial direction, from flowing beyond a predetermined distance.

However, the blocking wall 50 may adversely affect the flow of the molten glass MG within the channel 22.

In the following, effects of the blocking wall 50 will be described with reference to FIG. 4.

Figure 4:
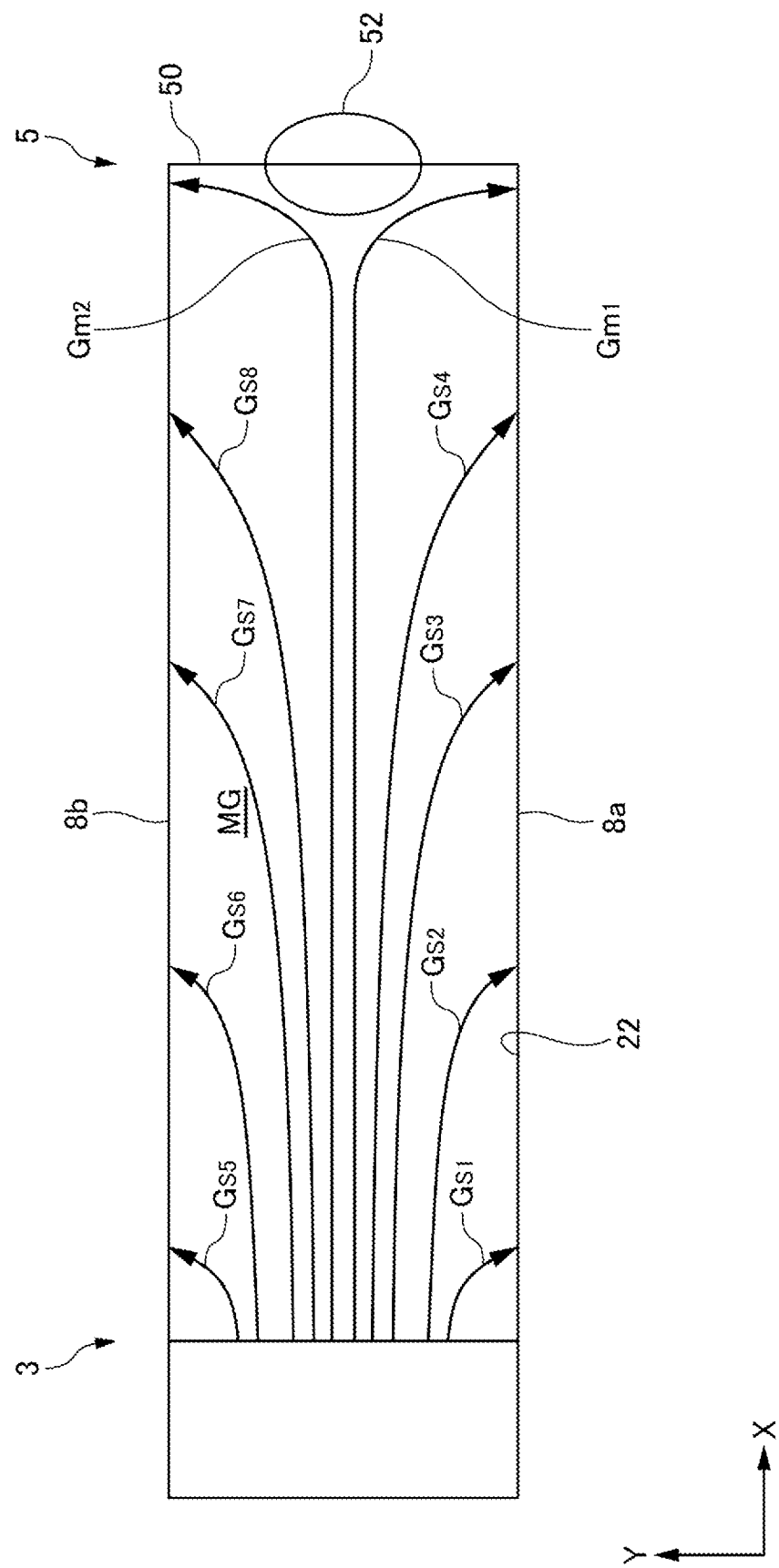
FIG. 4 is a top view schematically illustrating the directions of flow of molten glass at locations within a channel of the conventional forming apparatus.

FIG. 4 is a top view of schematically illustrating the channel 22 of the conventional forming apparatus 1. In FIG. 4, the directions of flow of molten glass MG at locations within the channel 22 are schematically illustrated.

As illustrated in FIG. 4, the molten glass MG, supplied from the first end 3 of the forming apparatus 1 to the channel 22, flows toward the second end 5 of the forming apparatus 1, that is, flows toward the right in the axial (X-direction) direction, which is a mainstream direction.

However, the dimension of the channel 22 in a direction (Y direction) perpendicular to the axial direction is sufficiently smaller than the dimension in the axial direction (X direction). Therefore, while the molten glass MG is flowing in the mainstream direction, portions of the molten glass MG are divided into branch streams Gs1 to Gs4, flow toward the outer surface 8a (the lower side in FIG. 4) of the forming apparatus 1, and flow out of the channel 22. Similarly, portions of the molten glass MG are divided into branch streams Gs5 to Gs8, flow toward the outer surfaces 8b (the upper side in FIG. 4) of the forming apparatus 1, and flow out of the channel 22.

Conversely, mainstreams Gm1 and Gm2 of the molten glass MG, which flow in the mainstream direction, reach the blocking wall 50 and collide with the blocking wall 50. As a result, the directions of the mainstreams Gm1 and Gm2 are changed by approximately 90 degrees. That is, as illustrated in FIG. 4, the direction of a portion of the mainstream Gm1 is changed by +90 degrees, and the direction of a portion of the other mainstream Gm2 is changed by −90 degrees.

The molten glass MG would likely to stagnate at a location where the directions of the mainstreams Gm1 and Gm2 are significantly changed, for example, in the vicinity of the blocking wall 50. In particular, the blocking wall 50 is located farthest from the position where the molten glass MG is supplied, that is, from the first end 3. Therefore, in the vicinity of the blocking wall 50, it would be difficult for a subsequent (new) flow of the molten glass MG to reduce or eliminate stagnation of the molten glass MG that has occurred in the vicinity of the blocking wall 50.

As a result, the molten glass MG would have difficulty flowing in the vicinity of the second end 5, that is, in the vicinity of the blocking wall 50, and, a stagnant portion 52 would be generated.

Note that since the temperature of the molten glass MG is high, if such a stagnant portion 52 is generated and the molten glass MG stagnates in the stagnant portion 52, certain components in the molten glass MG tend to volatilize. Therefore, there would be a high possibility that glass composition changes or devitrification occurs in the stagnant portion 52.

Further, in the stagnant portion 52, the molten glass MG would have difficulty flowing as designed. As a result, the thickness across the width (X direction in FIG. 1) of the glass ribbon GR on the second end 5 side of the forming apparatus 1 would tend to vary.

Due to such effects, it is considered that devitrification and composition changes of the glass ribbon GR occur and the thickness across the width of the glass ribbon GR varies.

Based on the above-described consideration, the inventors of the present application have found that the above-described problems can be alleviated by designing a channel structure in which a stagnant portion 52 of molten glass MG is unlikely to occur, and have achieved the present invention.

According to an embodiment of the present invention, a forming apparatus for forming a glass ribbon by a downdraw process is provided. The forming apparatus has an axial direction extending from a first end to a second end thereof. The first end is located on an inlet side from which molten glass is supplied. The forming apparatus includes a first protruding portion and a second protruding portion that are disposed at a top thereof and extend from the first end to the second end. A channel is provided between the first protruding portion and the second protruding portion. The molten glass flows within the channel from the first end to the second end. In a top view, a channel width of the channel continuously decreases toward the second end in the vicinity of the second end and becomes 0 (zero) at the second end. The channel width is in a direction perpendicular to the axial direction.

The forming apparatus according to the embodiment of the present invention does not include a blocking wall 50 on the second end side of the channel as in the conventional forming apparatus 1. Accordingly, in the forming apparatus according to the embodiment of the present invention, a stagnant portion 52 of molten glass MG is not readily generated on the second end side of the channel, and the above-described problems caused by such a stagnant portion 52 can be alleviated or avoided.

As a result, in the forming apparatus according to the embodiment of the present invention, when a glass ribbon is formed, devitrification and/or composition changes do not readily occur and variations in the thickness across the width of the glass ribbon can be significantly reduced.

Forming Apparatus According to Embodiment of Present Invention

Next, the forming apparatus according to the embodiment of the present invention will be described in further detail with reference to FIG. 5 through FIG. 7.

Figure 5:
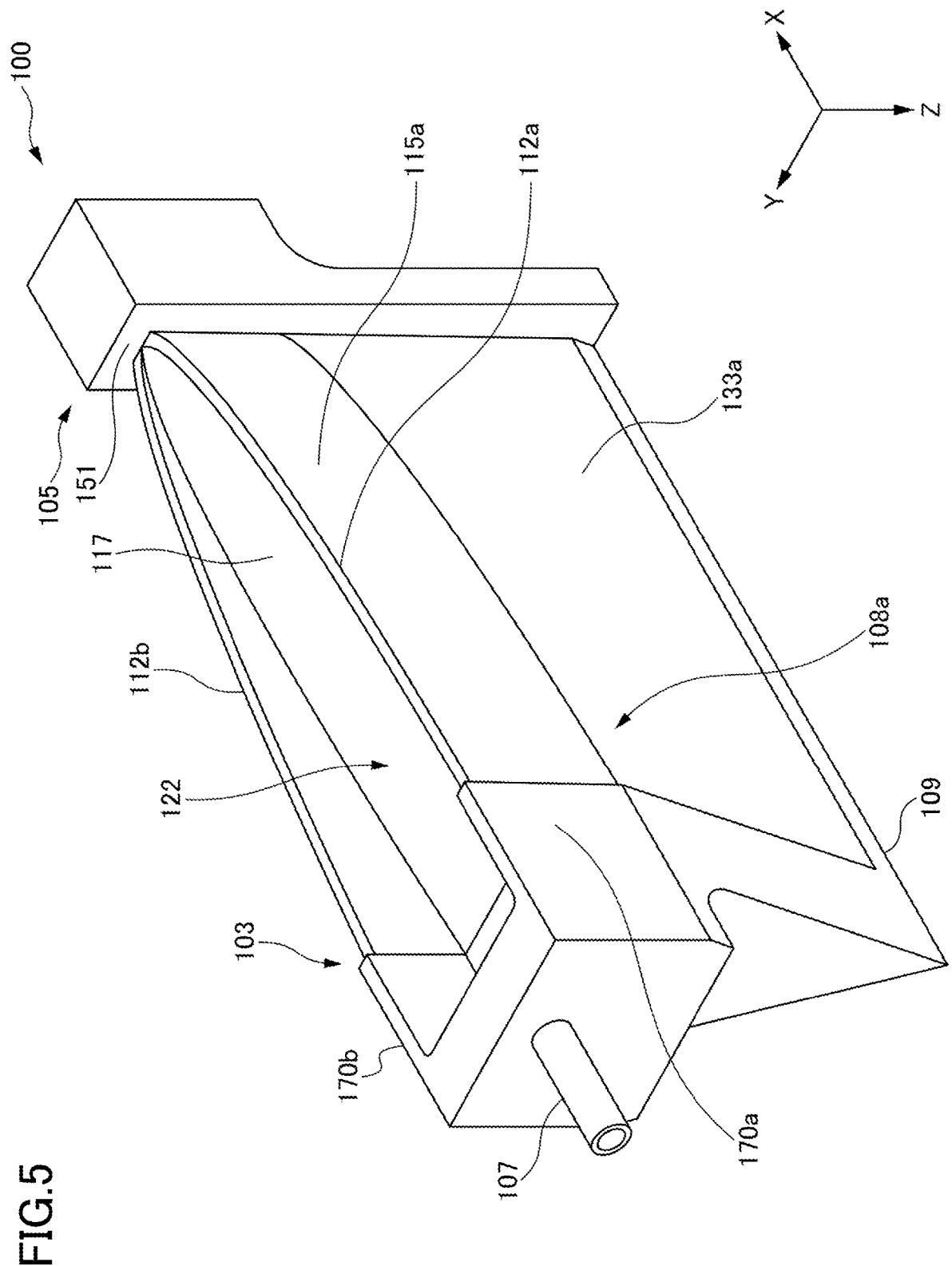
FIG. 5 is a perspective view schematically illustrating an example configuration of a forming apparatus according to an embodiment of the present invention.
Figure 6:
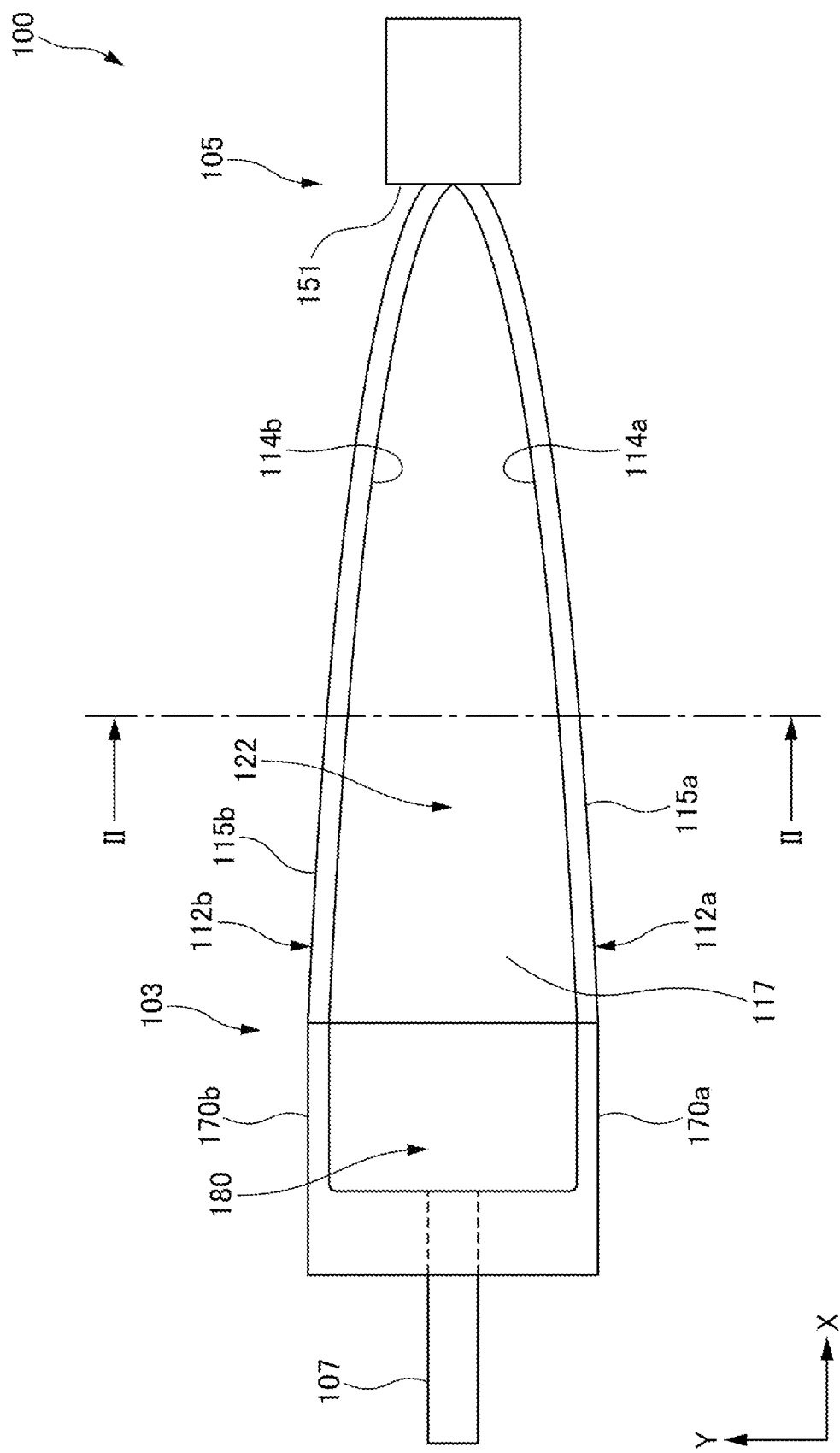
FIG. 6 is a top view schematically illustrating the forming apparatus of FIG. 5 according to the embodiment of the present invention.
Figure 7:
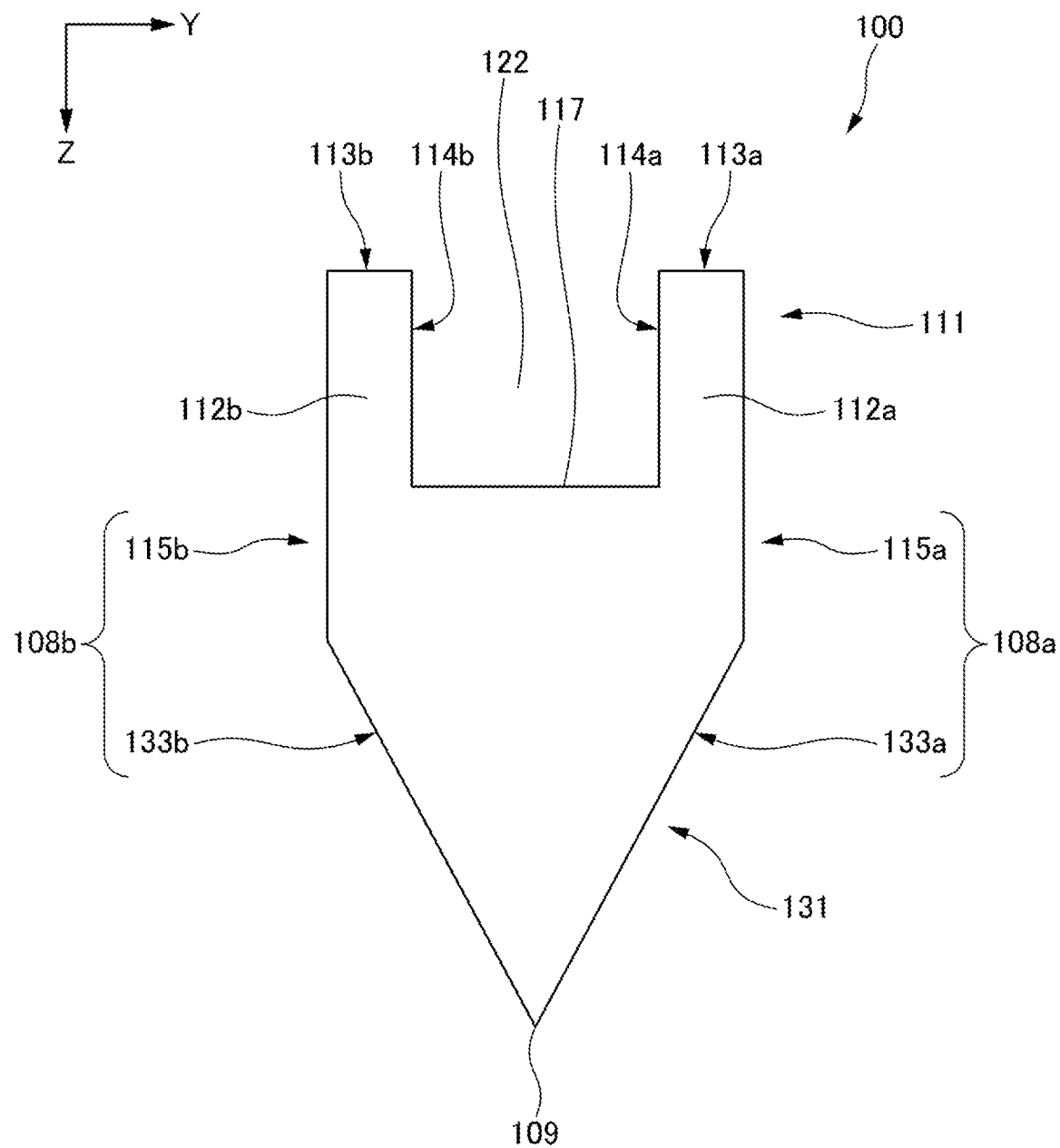
FIG. 7 is a cross-sectional view schematically illustrating the forming apparatus taken through II-II of FIG. 6 according to the embodiment of the present invention.

FIG. 5 through FIG. 7 schematically illustrate the configuration of a forming apparatus (hereinafter referred to as a "first forming apparatus") 100 according to an embodiment of the present invention.

FIG. 5 is a perspective view schematically illustrating the first forming apparatus 100. FIG. 6 is a top view schematically illustrating the first forming apparatus 100. FIG. 7 is a cross-sectional view schematically illustrating the first forming apparatus 100 taken through II-II of FIG. 6.

As illustrated in FIG. 5 through FIG. 7, the first forming apparatus 100 has an axial direction (X direction) extending from a first end 103 to a second end 105, and the first forming apparatus 100 on the first end 103 side is connected to a supply pipe 107 for molten glass. For clarification, part of the first forming apparatus 100 located behind the second end 105 is not depicted in FIG. 7.

As illustrated in FIG. 7, the first forming apparatus 100 has a substantially wedge shape in cross section perpendicular to the axial direction, and has a first outer surface 108a and a second outer surface 108b that are opposed to each other. The outer surfaces 108a and 108b are joined at a lower-side confluence edge 109.

The first forming apparatus 100 includes an upper first portion 111 and a lower second portion 131.

The first portion 111 of the first forming apparatus 100 includes two protruding portions 112a and 112b that are opposed to each other. The protruding portion 112a has an upper surface 113a, an inner surface 114a, and an outer surface 115a. The inner surface 114a and the outer surface 115a extend along the vertical direction (Z direction) and are opposite to each other. The inner surface 114a and the outer surface 115a are connected by the upper surface 113a. Similarly, the protruding portion 112b has an upper surface 113b, an inner surface 114b, and an outer surface 115b.

The protruding portion 112a and the protruding portion 112b may have substantially the same height.

Further, the first portion 111 of the of the first forming apparatus 100 has a bottom surface 117 between the two protruding portions 112a and 112b. The bottom surface 117 is configured to gradually decrease in depth from the first end 103 toward the second end 105 of the first forming apparatus 100.

A channel 122 is defined on the upper side of the first portion 111 by the inner surface 114a of the protruding portion 112a, the inner surface 114b of the protruding portion 112b, and the bottom surface 117. Because of the shape of the bottom surface 117, the channel 122 is configured such that the depth of the channel 122 gradually decreases from the first end 103 toward the second end 105 of the first forming apparatus 100 and becomes zero at or in the vicinity of the second end 105. The bottom surface 117 may be a curved surface, a flat surface, or a combination of a curved surface and a flat surface.

As illustrated in FIG. 5, the first portion 111 of the first forming apparatus 100 further includes a first stopper 170a and a second stopper 170b. The first stopper 170a and a second stopper 170b are provided on the upstream side of the protruding portions 112a and 112b in the axial direction and extend along the vertical direction (Z direction).

The first stopper 170a is provided on the same side as the outer surface 115a of the protruding portion 112a and is adjacent to the outer surface 115a. Similarly, the second stopper 170b is provided on the same side as the outer surface 115b of the protruding portion 112b and is adjacent to the outer surface 115b. The first stopper 170a is configured such that the upper end of the first stopper 170a is higher than the upper surface 113a of the protruding portion 112a. The second stopper 170b is configured such that the upper end of the second stopper 170b is higher than the upper surface 113b of the protruding portion 112b.

The first stopper 170a is provided so as to define the dimension in the width direction (X direction) of molten glass MG that flows down along the first outer surface 108a when a glass ribbon GR is formed by the first forming apparatus 100. Similarly, the second stopper 170b is provided so as to define the dimension in the width direction (X direction) of molten glass MG that flows down along the second outer surface 108b.

In the first forming apparatus 100, the first end 103 can be defined as a boundary position between the first stopper 170a and the protruding portion 112a or a boundary position between the second stopper 170b and the protruding portion 112b in a top view along the axial direction (X direction).

In the first forming apparatus 100, the second end 105 can be defined as an installation position of a tip wall 151 as will be described later.

Referring to FIG. 5 through FIG. 7 again, the second portion 131 of the first forming apparatus 100 has a first exterior surface 133a and a second exterior surface 133b that are opposed to each other. The first exterior surface 133a of the second portion 131 is connected to the outer surface 115a of the first portion 111, thereby constituting the first outer surface 108a of the first forming apparatus 100. Similarly, the second exterior surface 133b of the second portion 131 is connected to the outer surface 115b of the first portion 111, thereby constituting the second outer surface 108b of the first forming apparatus 100.

The first forming apparatus 100 further includes a rectifier 180 between the position where the supply pipe 107 is connected and the first end 103. The rectifier 180 is provided so as to regulate the flow of molten glass MG supplied from the supply pipe 107 to the first forming apparatus 100. However, the rectifier 180 may be omitted if unnecessary.

In the first forming apparatus 100, when the dimension of the channel 122 perpendicular to the axial direction (X direction) of the first forming apparatus 100 in a top view is referred to as a "channel width", the channel 122 is configured such that the channel width gradually decreases from the first end 103 to the second end 105. In other words, each of the protruding portion 112a and the protruding portion 112b is configured such that the channel width gradually decreases from the first end 103 to the second end 105. Note that the channel width is 0 (zero) at the second end 105.

Accordingly, as illustrated in FIG. 6, the first portion 111 of the first forming apparatus 100 has a substantially "boat shape" in a top view. That is, the channel 122 has a "pointed" shape toward the second end 105 from the first end 103.

The first forming apparatus 100 does not include a blocking wall 50 at the second end 105 as in the conventional forming apparatus 1. Instead, the first forming apparatus 100 includes the tip wall 151 at the second end 105.

The tip wall 151 is provided so as to block the flow of molten glass MG beyond the second end 105. However, it should be noted that, as will be described later, the influence of the tip wall 151 on the flow of molten glass MG completely differs from that of the conventional blocking wall 50.

In the following, characteristic effects of the first forming apparatus 100 will be described with reference to FIG. 8.

Figure 8:
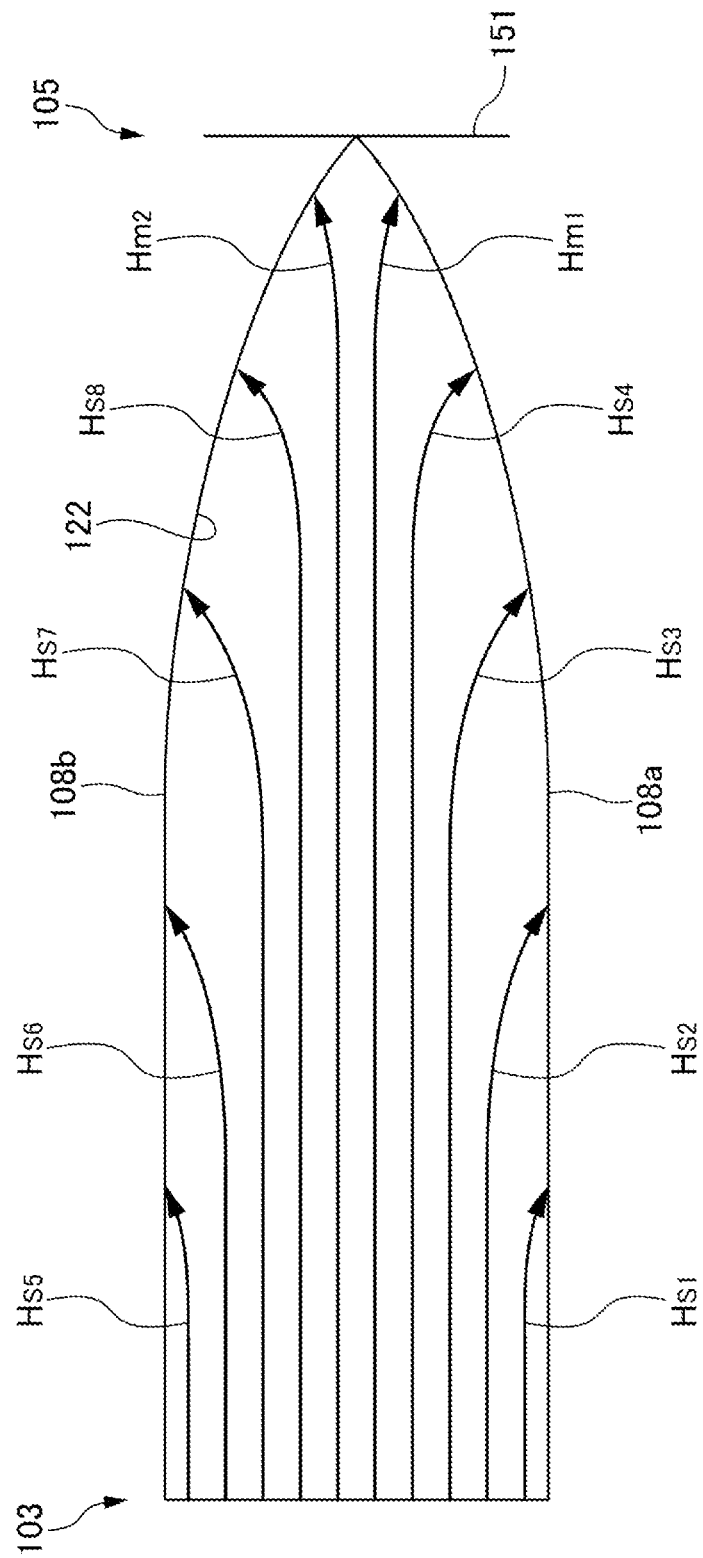
FIG. 8 is a top view schematically illustrating the directions of flow of molten glass at locations within a channel of the forming apparatus according to the embodiment of the present invention.

FIG. 8 is a drawing schematically illustrating the flow of molten glass MG within the channel 122 when a glass ribbon GR is formed by the first forming apparatus 100.

As illustrated in FIG. 8, molten glass MG supplied from the first end 103 of the first forming apparatus 100 to the channel 122 flows toward the right in the axial direction (the X direction), that is, toward the second end 105 of the first forming apparatus 100 as indicated by mainstreams Hm1 and Hm2.

The dimension in the channel width direction (Y direction) of the channel 122 is sufficiently smaller than the dimension in the axial direction (X direction) of the channel 122. Therefore, while the molten glass MG is flowing toward the second end 105, portions of the molten glass MG are divided into branch streams Hs1 to Hs4, flow toward the first outer surface 108a (the lower side of FIG. 8) of the first forming apparatus 100, and flow out of the channel 122. Similarly, portions of the molten glass MG are divided into branch streams Hs5 to Hs8, flow toward the second outer surface 108b (the upper side of FIG. 8) of the first forming apparatus 100, and then flow out of the channel 122.

In the first forming apparatus 100, even if the mainstreams Hm1 and Hm2 of the molten glass MG reach the second end 105 or the vicinity of the second end 105, it is unlikely that the directions of the mainstreams Hm1 and Hm2 are significantly changed. This is because the channel 122 has a structure in which the channel width of the channel 122 gradually decreases toward the second end 105 and reaches 0 (zero) at the second end 105. Therefore, similar to the branch streams Hs1 to Hs4, the mainstream Hm1 flows toward the first outer surface 108a of the first forming apparatus 100, and then flows out of the channel 122. Further, similar to the branch streams Hs5 to Hs8, the mainstream Hm2 flows toward the second outer surface 108b of the first forming apparatus 100, and then flows out of the channel 122.

Accordingly, a stagnant portion 52 is not as readily generated at the second end 105 of the first forming apparatus 100 as in the conventional forming apparatus 1. Thus, problems such as devitrification and/or composition changes of a glass ribbon GR as in the conventional apparatus can be significantly reduced.

The flow rates of the branch streams Hs1 to Hs8 and the mainstreams Hm1 and Hm2 can be adjusted by appropriately designing the supply flow rate of molten glass MG at the first end 103, the depth and the gradient of the channel 122, and the channel width across the axial direction of the channel 122.

Therefore, by causing the same amount of molten glass MG to flow down from each of the branch streams Hs1 to Hs4 and the mainstream Hm1 along the first outer surface 108a of the first forming apparatus 100, the thickness across the width (X direction) of the molten glass MG flowing along the first outer surface 108a can be made uniform. Similarly, by causing the same amount of molten glass MG to flow down from each of the branch streams Hs5 to Hs8 and the mainstream Hm2 along the second outer surface 108b of the first forming apparatus 100, the thickness across the width (X direction) of molten glass MG flowing along the second outer surface 108b can be made uniform.

Because of the above-described effects, when a glass ribbon is formed by the first forming apparatus 100, devitrification and/or composition changes do not readily occur, and further, the thickness across the width of the glass ribbon can be made uniform.

The first forming apparatus 100 as illustrated in FIG. 5 through FIG. 7 has a configuration in which the channel width of the channel 122 gradually decreases from the first end 103 toward the second end 105 in a top view. In addition, the contour of each of the first outer surface 108a and the second outer surface 108b is represented by a single curved line in a top view.

However, the above-described configuration is merely an example, and the first forming apparatus 100 is not limited to the above-described configuration.

For example, in a top view, the channel 122 may have a configuration in which the channel width of the channel 122 is constant from the first end 103 to a predetermined position (hereinafter referred to as an "inflection position") and gradually decreases from the inflection position to the second end 105. For example, the inflection position may be in the range of 0.1 L1 to 0.9 L1 from the first end 103, where L1 denotes the distance from the first end 103 to the second end 105.

In the present application, a region where the distance from the first end 103 in the axial direction is in the range of 0.9 L1 to L1, that is, a range from 0.9 L1 to the second end 105 is particularly defined as the "vicinity" of the second end 105. Based on the above definition, it can be said that the first forming apparatus 100 has a configuration in which the channel width gradually decreases toward the second end 105 in the "vicinity" of the second end 105 and becomes 0 at the second end 105.

Further, each of the first outer surface 108a and the second outer surface 108b may have a contour represented by one or more straight lines in a top view. Alternatively, the contour of each of the first outer surface 108a and the second outer surface 108b may be represented by a combination of a curved line and a straight line.

The depth of the channel 122 may be constant from the first end 103 to the inflection position, and may gradually decrease from the inflection position to the second end 105.

In the first forming apparatus 100, an axis that extends in a direction perpendicular to the channel width of the channel 122 and divides the channel width into two is referred to as a "channel axis". In this case, in a top view, the contour of the channel 122 in the vicinity of the second end 105 may be represented by curved lines symmetrical with respect to the channel axis and/or one or more pairs of straight lines symmetrical with respect to the channel axis.

In the above description, the operation of the first forming apparatus 100 has been described by taking an example in which the protruding portion 112a and the protruding portion 112b have substantially the same height. In this case, molten glass MG flows down along both the first outer surface 108a and the second outer surface 108b.

However, this is merely an example, and the protruding portion 112a and the protruding portion 112b may have different heights. In this case, molten glass MG flows out from one protruding portion side only. For example, if the protruding portion 112a is higher than the protruding portion 112b, molten glass MG flowing in the channel 122 flows out from the protruding portion 112b side only, and does not flow out from the protruding portion 112a side.

Various other changes may also be made.

Another Forming Apparatus According to One Embodiment of Present Invention

Next, another forming apparatus according to an embodiment of the present invention will be described with reference to FIG. 9 through FIG. 11.

Figure 9:
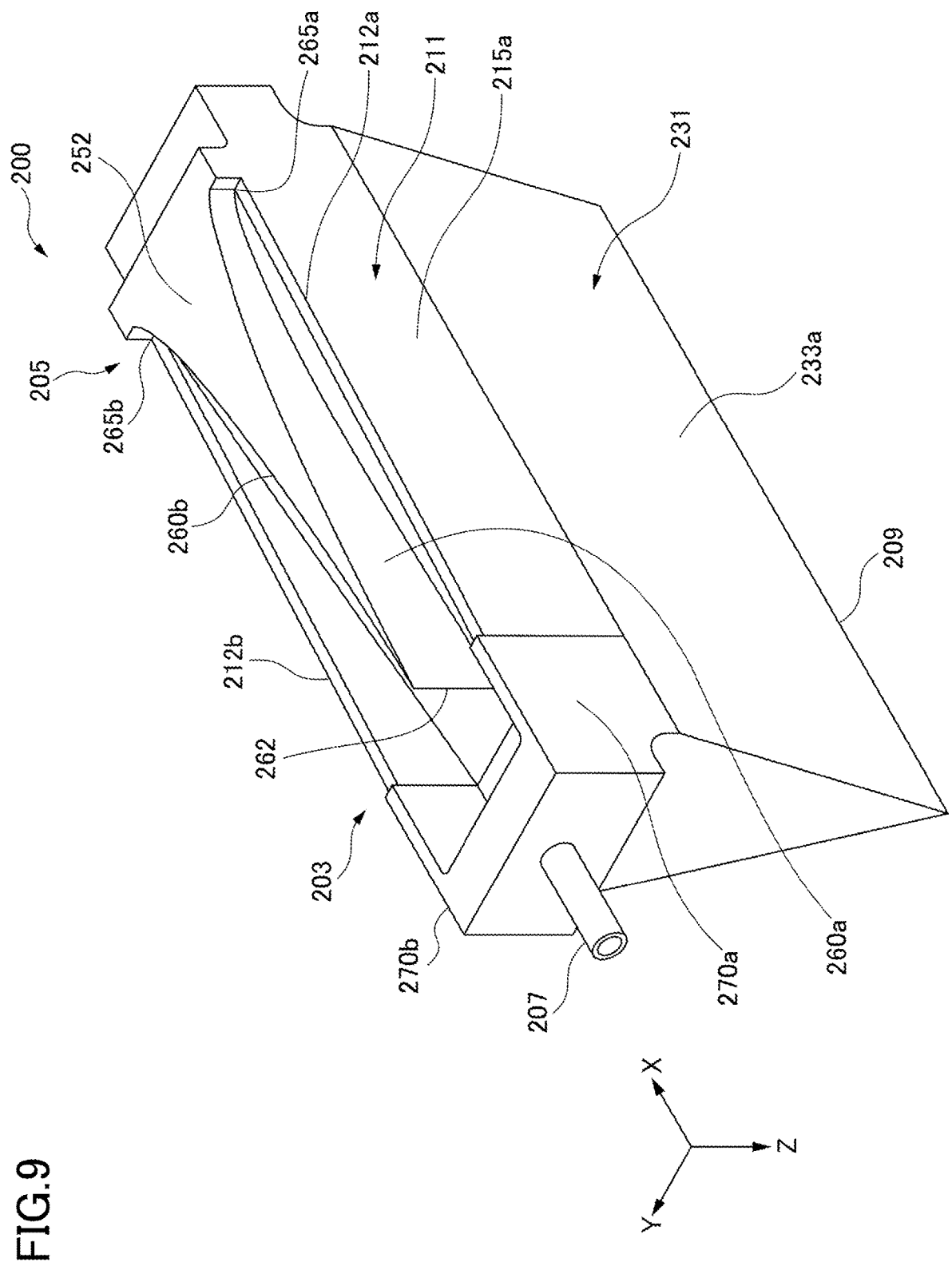
FIG. 9 is a perspective view schematically illustrating an example configuration of another forming apparatus according to an embodiment of the present invention.
Figure 10:
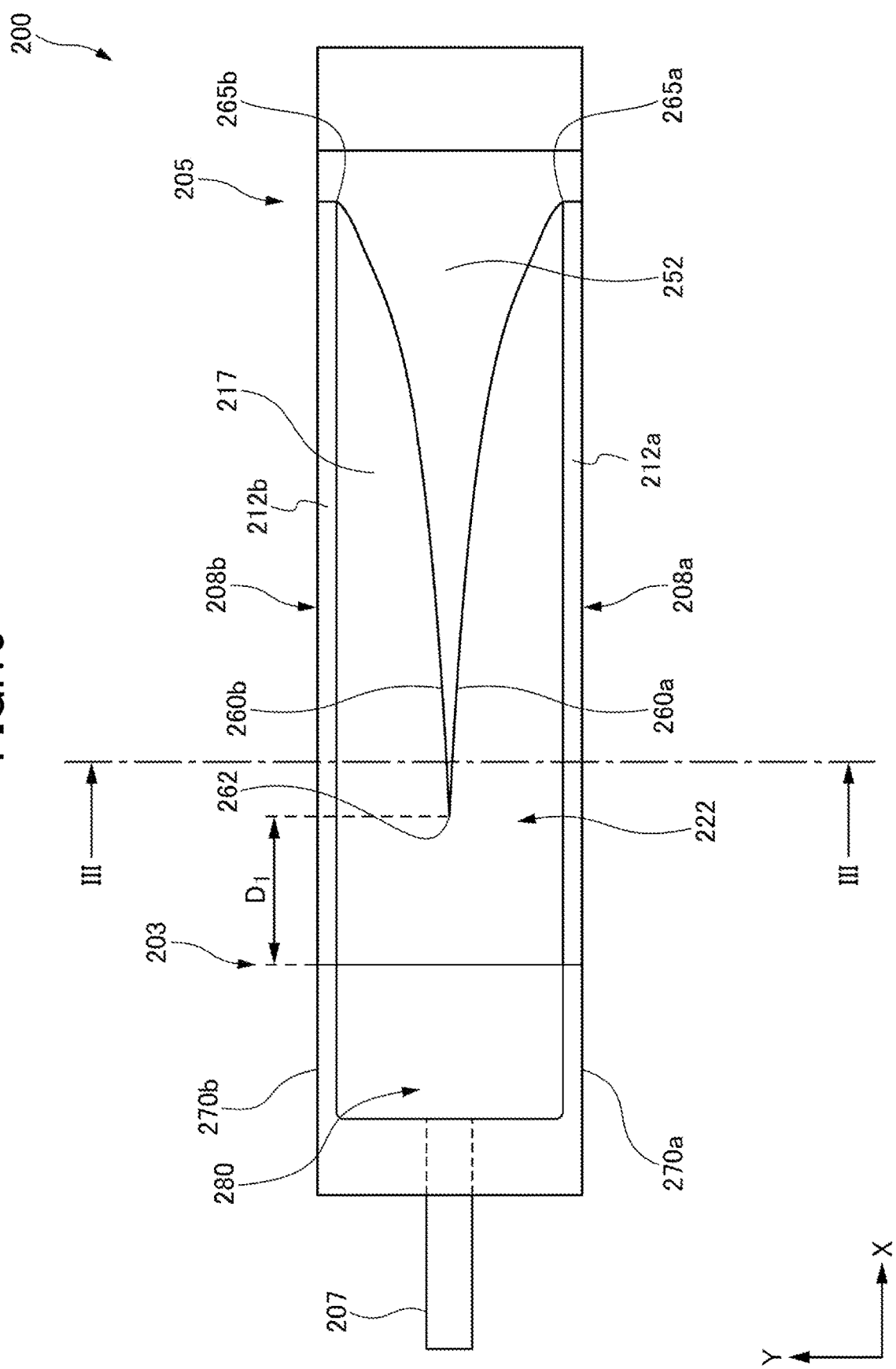
FIG. 10 is a top view schematically illustrating the forming apparatus of FIG. 9.
Figure 11:
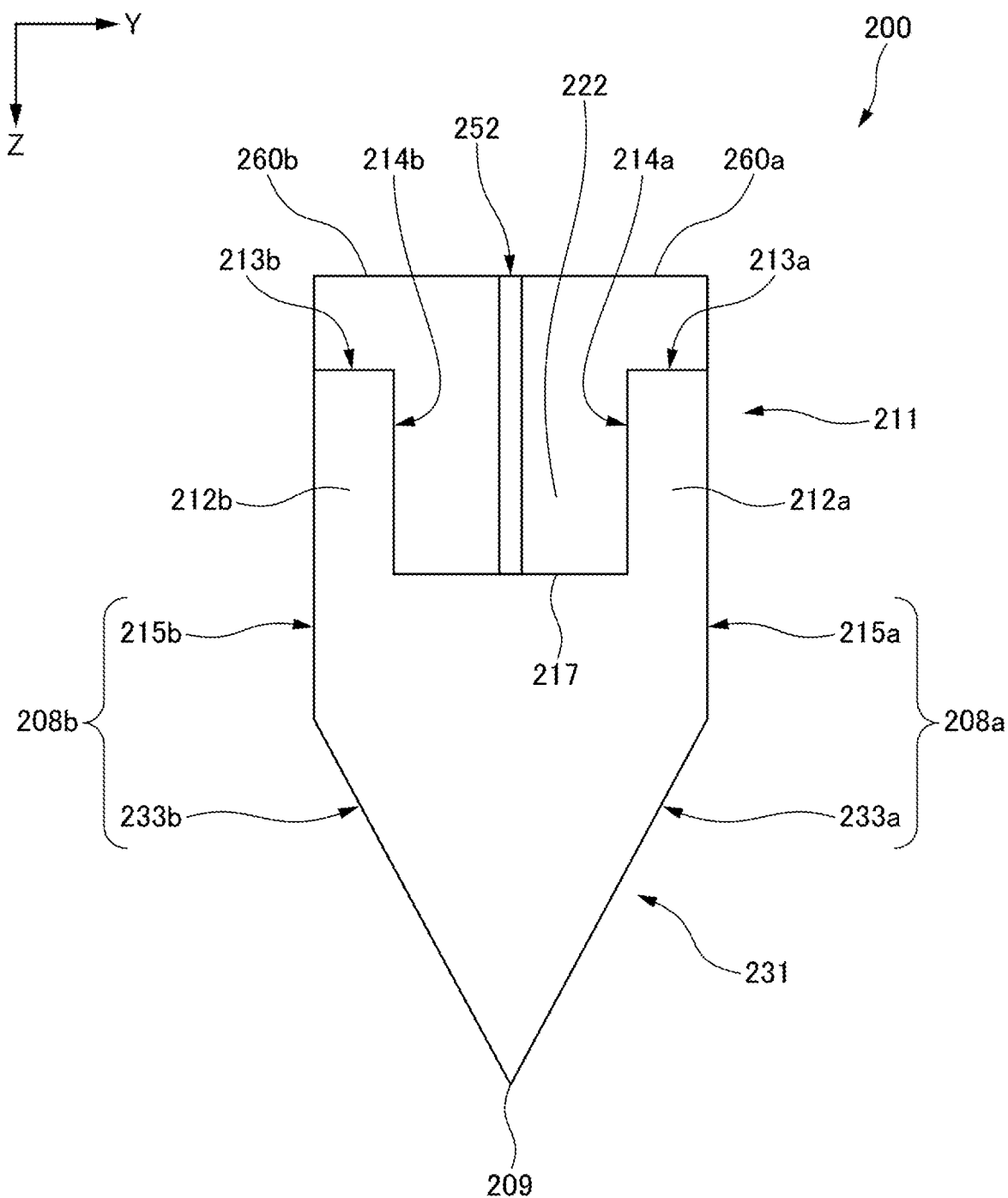
FIG. 11 is a cross-sectional view schematically illustrating the forming apparatus taken through III-III of FIG. 10.

FIG. 9 through FIG. 11 schematically illustrate the configuration of another forming apparatus (hereinafter referred to as a "second forming apparatus") 200 according to an embodiment of the present invention.

FIG. 9 is a perspective view schematically illustrating the second forming apparatus 200. FIG. 10 is a top view schematically illustrating the second forming apparatus 200. FIG. 11 is a cross-sectional view schematically illustrating the second forming apparatus 200 taken through of FIG. 10.

As illustrated in FIG. 9 through FIG. 11, the second forming apparatus 200 has an axial direction (X direction) extending from a first end 203 to a second end 205, and the second forming apparatus 200 on the first end 203 side is connected to a supply pipe 207 for molten glass.

As illustrated in FIG. 11, the second forming apparatus 200 has a substantially wedge shape in cross section perpendicular to the axial direction, and has a first outer surface 208a and a second outer surface 208b that are opposed to each other. The first outer surface 208a and the second outer surface 208b are joined at a lower-side confluence edge 209.

The second forming apparatus 200 includes a first portion 211 on the upper side thereof and a second portion 231 on the lower side thereof.

The first portion 211 of the second forming apparatus 200 includes two protruding portions 212a and 212b that are opposed to each other. The protruding portion 212a has an upper surface 213a, an inner surface 214a, and an outer surface 215a. The inner surface 214a and the outer surface 215a extend along the vertical direction (Z direction) and are opposite to each other. The inner surface 214a and the outer surface 215a are connected by the upper surface 213a. Similarly, the protruding portion 212b has an upper surface 213b, an inner surface 214b, and an outer surface 215b.

Further, the first portion 211 of the second forming apparatus 200 has a bottom surface 217 between the two protruding portion 212a and 212b. The bottom surface 217 is configured to gradually decrease in depth from the first end 203 toward the second end 205 of the second forming apparatus 200.

A channel 222 is defined in the first portion 211 by the inner surface 214a of the protruding portion 212a, the inner surface 214b of the protruding portion 212b, and the bottom surface 217. Because of the shape of the bottom surface 217, the channel 222 is configured such that the depth of the channel 222 gradually decreases from the first end 203 toward the second end 205 of the second forming apparatus 200 and becomes zero at or in the vicinity of the second end 205. The bottom surface 217 may be a curved surface, a flat surface, or a combination of a curved surface and a flat surface.

The first portion 211 of the second forming apparatus 200 further includes a first stopper 270a and a second stopper 270b. The first stopper 270a and the second stopper 270b are provided on the upstream side of the protruding portions 212a and 212b in the axial direction and extend along the vertical direction (Z direction).

The first stopper 270a is provided on the same side as the outer surface 215a of the protruding portion 212a and is adjacent to the outer surface 215a. Similarly, the second stopper 270b is provided on the same side as the outer surface 215b of the protruding portion 212b and is adjacent to the outer surface 215b. The first stopper 270a is configured to be higher than the upper surface 213a of the protruding portion 212a. The second stopper 270b is configured to be higher than the upper surface 213b of the protruding portion 212b.

The first stopper 270a is provided so as to define the dimension in the width direction (X direction) of molten glass MG that flows down along the first outer surface 208a when a glass ribbon GR is formed by the second forming apparatus 200. Similarly, the second stopper 270b is provided so as to define the dimension in the width direction (X direction) of molten glass MG that flows down along the second outer surface 208b.

In the second forming apparatus 200, the above-described first end 203 can be defined as a boundary position between the first stopper 270a and the protruding portion 212a or a boundary position between the second stopper 270b and the protruding portion 212b in a top view along the axial direction (X direction).

Referring to FIG. 9 through FIG. 11 again, the second portion 231 of the second forming apparatus 200 has a first exterior surface 233a and a second exterior surface 233b that are opposed to each other. The first exterior surface 233a of the second portion 231 is connected to the outer surface 215a of the first portion 211, thereby constituting the first outer surface 208a of the second forming apparatus 200. Similarly, the second exterior surface 233b of the second portion 231 is connected to the outer surface 215b of the first portion 211, thereby constituting the second outer surface 208b of the second forming apparatus 200.

The second forming apparatus 200 further includes a rectifier 280 between the position where the supply pipe 207 is connected and the first end 203. The rectifier 280 is provided so as to regulate the flow of molten glass MG supplied from the supply pipe 207 to the second forming apparatus 200. However, the rectifier 280 may be omitted if unnecessary.

In the second forming apparatus 200, the dimension of the channel 222 perpendicular to the axial direction (X direction) of the second forming apparatus 200 is referred to as a "channel width". Further, an axis that extends in a direction perpendicular to the channel width of the channel 222 and divides the channel width into two is referred to as a "channel axis".

The second forming apparatus 200 further includes a direction adjustment member 252 provided in the channel 222. The direction adjustment member 252 has a first wall 260a and a second wall 260b that extend from the bottom surface 217 of the first portion 211 in the vertical direction (Z direction).

The first wall 260a and the second wall 260b have shapes symmetrical with respect to the channel axis of the channel 222, and are joined together at a joint position 262 that is provided at a predetermined position in the channel 222.

Note that, at the joint position 262, the first wall 260a and the second wall 260b are configured to meet at one point in a top view. Therefore, the channel width at the joint position 262 is equal to the sum of the distance from the first wall 260a to the protruding portion 212a and the distance from the second wall 260b to the protruding portion 212b.

The joint position 262 is provided at a position on the channel axis between the first end 203 and the second end 205 (excluding the second end 205).

For example, in the example illustrated in FIG. 9 and FIG. 10, the joint position 262 is on the channel axis and at a distance D1 from a boundary position between the first stopper 270a and the first outer surface 208a, that is, from the first end 203 toward the second end 205.

In a top view, the first wall 260a is configured such that the distance from the first wall 260a to the protruding portion 212a gradually decreases from the joint position 262 to a first end point 265a provided at the second end 205. The distance from the first wall 260a to the protruding portion 212a is 0 (zero) at the second end 205.

Similarly, in a top view, the second wall 260b is configured such that the distance from the second wall 260b to the protruding portion 212b gradually decreases from the joint position 262 to a second end point 265b provided at the second end 205. The distance from the second wall 260b to the protruding portion 212b is 0 (zero) at the second end 205.

As a result, with the direction adjustment member 252, the channel 222 is configured such that the channel width gradually decreases from the first end 203 to the second end 205. The channel width is 0 (zero) at the second end 205.

With the configuration of the second forming apparatus 200, the channel width of the channel 222 on the downstream side of the joint position 262 is defined as the sum of the distance from the first wall 260a to the protruding portion 212a and the distance from the second wall 260b to the protruding portion 212b.

Accordingly, the second forming apparatus 200 is configured not to include a blocking wall 50 at the second end 205 as in the conventional forming apparatus 1.

In the following, characteristic effects of the second forming apparatus 200 will be described with reference to FIG. 12.

Figure 12:
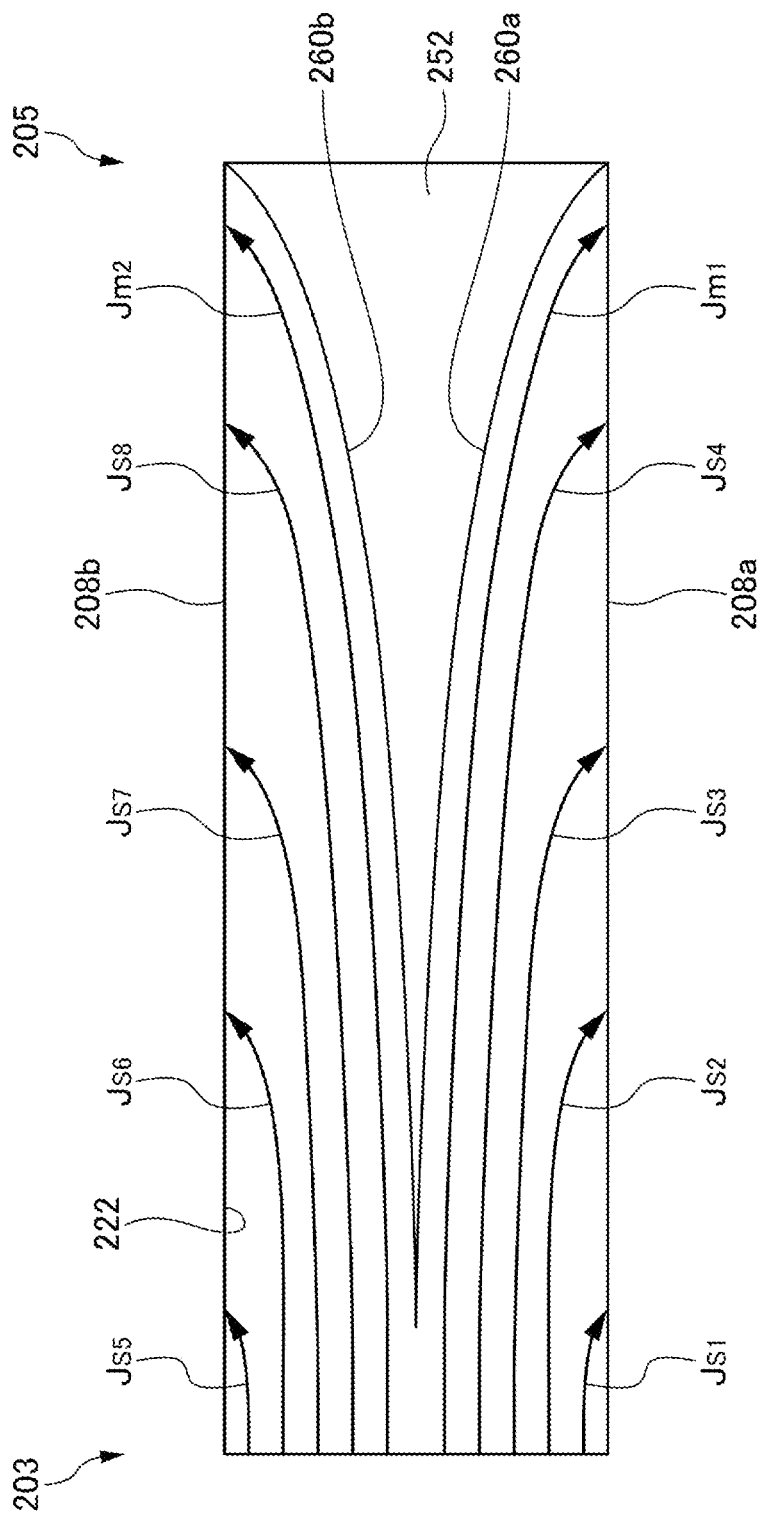
FIG. 12 is a top view schematically illustrating the directions of flow of molten glass at locations within a channel of the other forming apparatus according to the embodiment of the present invention.

FIG. 12 is a drawing schematically illustrating the flow of molten glass MG within the channel 222 when a glass ribbon GR is formed by the second forming apparatus 200.

As illustrated in FIG. 12, molten glass MG supplied from the first end 203 of the second forming apparatus 200 to the channel 222 flows toward the right in the axial direction (the X direction), that is, toward the second end 205 of the second forming apparatus 200 as indicated by mainstreams Jm1 and Jm2.

The dimension in the width direction (Y direction) of the channel 222 is sufficiently smaller than the dimension in the axial direction (X direction) of the channel 222. Therefore, while the molten glass MG is flowing toward the second end 205, portions of the molten glass MG are divided into branch streams Js1 to Js4, flow toward the first outer surface 208a (the lower side of FIG. 12) of the second forming apparatus 200, and flow out of the channel 222. Similarly, portions of the molten glass MG are divided into branch streams Js5 to Js8, flow toward the second outer surface 208b (the upper side of FIG. 8) of the second forming apparatus 200, and flow out of the channel 222.

In the second forming apparatus 200, even if the mainstreams Jm1 and Jm2 of the molten glass MG reach the second end 205 or the vicinity of the second end 205, it is unlikely that the directions of the mainstreams Jm1 and Jm2 are significantly changed.

This is because the channel 222 has a structure in which the channel width of the channel 222 gradually decreases from the joint position 262 toward the second end 205 and reaches 0 (zero) at the second end 205. Therefore, similar to the branch streams Js1 to Js4, the mainstream Jm1 flows toward the first outer surface 208a of the second forming apparatus 200, and then flows out of the channel 222. Further, similar to the branch streams Js5 to Js8, the mainstream Jm2 flows toward the second outer surface 208b of the second forming apparatus 200, and then flows out of the channel 222.

Accordingly, a stagnant portion 52 is not as readily generated at the second end 205 of the second forming apparatus 200 as in the conventional forming apparatus 1. Thus, problems such as devitrification and/or composition changes of a glass ribbon GR as in the conventional apparatus can be significantly reduced.

The flow rates of the branch streams Js1 to Js8 and the mainstreams Jm1 and Jm2 can be adjusted by appropriately designing the supply flow rate of molten glass MG at the first end 203, the depth and the gradient of the channel 222, the distance D1 from the first end 203 to the joint position 262, and the channel width across the channel axis of the channel 222.

Therefore, the same amount of molten glass MG can flow down from each of the branch streams Js1 to Js8 and the mainstreams Jm1 and Jm2 along the first outer surface 208a of the second forming apparatus 200, and as a result, the thickness across the width (X direction) of the molten glass MG flowing along the first outer surface 208a can be made uniform. Similarly, the same amount of molten glass MG can flow down from each of the branch streams Js5 to Js8 and the mainstream Jm2 along the second outer surface 208b of the second forming apparatus 200, and as a result, the thickness across the width (X direction) of the molten glass MG flowing along the second outer surface 208b can be made uniform.

Because of the above-described effects, when a glass ribbon GR is formed by the second forming apparatus 200, devitrification and/or composition changes do not readily occur, and further, the thickness across the width of the glass ribbon GR can be made uniform.

According to an embodiment, it is possible to provide a forming apparatus in which, when forming a glass ribbon, devitrification and composition changes do not readily occur and variations in the thickness across the width of the glass ribbon can be reduced.

The second forming apparatus 200 as illustrated in FIG. 9 through FIG. 11 has a configuration in which the channel width of the channel 222 gradually decreases from the joint position 262 to the second end 205 in a top view. In addition, the contour of each of the first wall 260a and the second wall 260b is represented by a single curved line in a top view.

However, the above-described configuration is merely an example, and the second forming apparatus 200 is not limited to the above-described configuration.

For example, in a top view, the joint position 262 may be in the range of 0 to 0.9 L1 from the first end 203, where L1 denotes the distance from the first end 203 to the second end 205. For example, the joint position 262 may be in the range of 0 to 0.4 L1 from the first end 203, and may be in the range of 0.1 L1 to 0.3 L1 from the first end 203.

Further, each of the first wall 260a and the second wall 260b may have a contour represented by one or more straight lines in a top view. Alternatively, the contour of the each of the first wall 260a and the second wall 260b may be represented by a combination of a curved line and a straight line in a top view. The forming apparatus 200 may be constituted by one of two sides divided along the channel axis, and may include only one protruding portion from which molten glass MG overflows and flows out.

Various other changes may also be made.

The first forming apparatus 100 and the second forming apparatus 200 according to the embodiments of the present invention have been described above.

However, aspects of the present invention are not limited to the first forming apparatus 100 and the second forming apparatus 200. That is, any forming apparatus according to an aspect of the preset invention may be employed as long as the channel width continuously decreases toward the second end and becomes 0 at the second end.

What is claimed is:

1. A forming apparatus for forming a glass ribbon, comprising:
a body having a first end and a second end in an axial direction of the body and comprising a first protruding portion and a second protruding portion extending from the first end to the second end such that a channel is formed between the first protruding portion and the second protruding portion,
wherein the body has an inlet configured to supply a molten glass from the first end to the channel such that the molten glass flows within the channel from the first end toward the second end, and the channel of the body has a channel width in a direction perpendicular to the axial direction such that a portion of the channel width continuously decreases toward the second end and becomes 0 at the second end,
wherein the portion of the channel has a pointed shape toward the second end, and
wherein the pointed shape of the channel has curved lines symmetrical with respect to a channel axis dividing the channel width into two along the axial direction.

2. The forming apparatus according to claim 1, wherein the first protruding portion and the second protruding portion have substantially a same height.

3. The forming apparatus according to claim 1, wherein the first protruding portion is higher than the second protruding portion.

4. The forming apparatus according to claim 1, wherein the pointed shape of the channel has one or more pairs of straight lines symmetrical with respect to a channel axis dividing the channel width into two along the axial direction.

5. The forming apparatus according to claim 1, wherein the first and second protruding portions of the body are formed such that the channel width of the channel continuously decreases toward the second end and becomes 0 at the second end from a bottom of the channel to a top of the channel.

6. The forming apparatus according to claim 1, wherein the first and second protruding portions of the body are formed such that the first and second protruding portions form a boat shape.

7. The forming apparatus according to claim 1, wherein the body has a tip wall formed at the second end of the body and configured to block a flow of the molten glass beyond the second end.

8. The forming apparatus according to claim 1, wherein the body has a bottom surface formed such that a depth of the channel decreases from a first end side toward a second end side.

9. The forming apparatus according to claim 1, wherein the body has a bottom surface formed such that a depth of the channel decreases from a first end side toward a second end side and becomes 0 at the second end.

10. The forming apparatus according to claim 1, wherein the body includes a rectifier formed between the inlet and the first end such that the rectifier regulates a flow of the molten glass supplied from the inlet to the channel.

11. The forming apparatus according to claim 1, wherein the first protruding portion and the second protruding portion have substantially a same height.

12. The forming apparatus according to claim 1, wherein the first protruding portion is higher than the second protruding portion.

13. The forming apparatus according to claim 1, wherein the first and second protruding portions of the body are formed such that the channel width of the channel continuously decreases toward the second end and becomes 0 at the second end from a bottom of the channel to a top of the channel.

14. The forming apparatus according to claim 1, wherein the first and second protruding portions of the body are formed such that the first and second protruding portions form a boat shape.

* * * * *